Nov. 14, 1950
C. W. KUHN
2,530,305
AUTOMATIC CONTROL SWITCH
Filed May 15, 1948
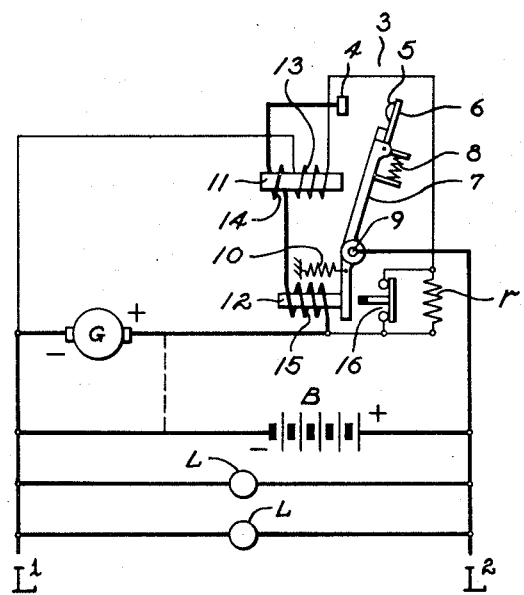
Inventor
Clarence W. Kuhn
By Frank H. Hubbard
Attorney Patented Nov. 14, 1950

2,530,305

UNITED STATES PATENT OFFICE 2,530,305

AUTOMATIC CONTROL SWITCH

Clarence W. Kuhn, Wauwatosa, Wis., assignor to Cutler-Hammer, Inc., Milwaukee, Wis., a corporation of Delaware Application May 15, 1948, Serial No. 27,259

4 Claims. (Cl. 320—33)

This invention relates to automatic control switches for use in power systems of the type including a storage battery and a generator for charging the same.

It is common practice in systems of the aforesaid type to control the charging circuit between the generator and the battery by means of a so-called "reverse current switch" having a shunt winding connected across the terminals of the generator and a series winding connected in the charging circuit. The shunt winding effects closure of the switch for establishment of the charging circuit when the generator voltage equals or exceeds the battery voltage, and the series winding assists the shunt winding in holding the switch in closed position as long as the generator voltage exceeds the battery voltage. When the generator voltage falls below the battery voltage so that current from the battery tends to flow in a reverse direction through the charging circuit, the current in the series winding is reversed so that said winding acts in opposition to the shunt winding to effect opening of the switch for disconnection of the battery from the generator.

However, in practice it has been found that under certain conditions a reverse current switch of the above described type is likely to be maintained in closed position under reverse current conditions in its series winding. For example, this is likely to occur if the current in the series winding is suddenly reversed due to a short-circuit in the charging circuit. Also if the control switch is inadvertently closed either manually or under the action of accelerating forces caused by shock the same is likely to be held in closed position by energization of its series winding to permit discharge of the battery through the generator.

The present invention has among its objects to provide an improved reverse current control switch for power systems of the aforesaid type which overcomes the aforementioned objections.

Another object is to provide a reverse current control switch for power systems of the aforesaid type having simple and reliable control means associated therewith for insuring immediate opening thereof under reverse current conditions in the charging circuit.

Various other objects and advantages of the invention will hereinafter appear.

The accompanying drawing illustrates somewhat schematically and diagrammatically an embodiment of the invention which will now be described, it being understood that the embodiment illustrated is susceptible of modification without departing from the spirit and scope of the appended claims.

Referring to the drawing, the same illustrates a power system including a battery B which is connected to lines $L^1$, $L^2$ to supply current to translating devices L connected between the said lines. The system also includes a generator G and a reverse current switch 3 for automatically controlling a charging circuit between said generator and the battery B.

The switch illustrated is provided with a stationary contact 4 and a cooperating movable contact 5 which is carried by an arm 6 pivotally mounted upon the upper end of an armature member 7. Arm 6 is yieldingly supported upon armature 7 by spring 8, and said armature is pivotally supported at a point intermediate its ends upon a stationary pivot pin 9. Said armature member is biased toward the open position shown in the drawing by a spring 10 and has a pair of operating core members 11 and 12 associated therewith, the former being arranged above the pivot point 9 and the latter below the same. Core member 11 is provided with a shunt winding 13 and a series winding 14, and core member 12 is provided with a series winding 15.

The shunt winding 13 is permanently connected across the terminals of generator G and has a resistance $r$ connected in series therewith which is shunted by normally closed auxiliary contacts 16 associated with the lower end of armature 7. The windings 14 and 15 are connected in series with each other between the positive terminal of generator G and contact 4. Line $L^1$ is connected to the negative terminal of generator G, and armature 7 is connected to line $L^2$ so that a charging circuit is established between said generator and battery B upon closure of contacts 4 and 5.

The operation of the aforedescribed reverse current switch will now be more fully set forth. When the voltage of generator G equals or exceeds the voltage of battery B, shunt winding 13 effects response of armature 7 to move contact 5 into engagement with contact 4 for establishment of the charging circuit between generator G and battery B. Current is then supplied from the positive terminal of generator G through the series windings 14 and 15 to line $L^2$ through battery B and the translating devices L to line $L^1$, and thence to the negative terminal of generator G. Spring 8 permits continued movement of armature 7 into engagement with core member 11 after contact 5 engages contact 4, and during such movement of the armature auxiliary contacts 16 are opened to include resistance $r$ in the energizing circuit of shunt winding 13 for weakening of said winding. The series winding 14 acts cumulatively with the shunt winding 13 to maintain armature 7 in circuit closing position against the biasing force of spring 3, and the attractive force of series winding 15, as long as the voltage of generator G exceeds the voltage of battery B.

When the voltage of generator G drops below the battery voltage windings 14 and 15 are energized by reverse current in the charging circuit. Winding 14 then acts in opposition to the shunt winding 13 to reduce the holding effect of the latter winding, and armature 7 is immediately moved into open position by the attractive force of winding 15 and the biasing force of spring 3. Thus immediately upon reversal of current in the charging circuit, contact 5 is moved out of engagement with contact 4 to interrupt the charging circuit and thereby prevent discharge of the battery through the generator.

In connection with the foregoing it should be noted that the above described reverse current control switch operates to insure immediate interruption of the charging circuit upon short-circuit conditions therein. For example, if a short-circuit occurs between the positive terminal of generator G and the negative terminal of battery B, as indicated by dotted lines in the drawing, the current in windings 14 and 15 will be suddenly reversed and the latter winding will effect opening of the switch at the instant the holding effect of the shunt winding 13 is neutralized by reverse current in the series winding 14. Also it should be noted that if the reverse current control switch is inadvertently closed for a temporary period while the generator is at rest both of the series windings 14 and 15 will be energized by reverse current in the charging circuit. However, under this condition the attractive force of winding 15 overcomes the attractive force of winding 14 to prevent continued closure of the switch by the latter winding.

What I claim as new and desire to secure by Letters Patent is:

1. In a power supply system, the combination with a battery and a generator for charging the same, of a normally open control switch for establishing a charging circuit between said generator and said battery, a shunt operating winding for said switch connected across the terminals of said generator to close said switch when the voltage of said generator equals or exceeds the voltage of said battery, and a pair of series windings associated with said switch for inclusion in said charging circuit upon closure of said switch, one of said series windings tending when energized to effect opening of said switch, and the other of said series windings acting cumulatively with said shunt winding to maintain said switch in closed position as long as the voltage of said generator exceeds the voltage of said battery, and acting in opposition thereto when the voltage of said generator drops below the voltage of said battery.

2. In a power supply system, the combination with a battery and a generator for charging the same, of a normally open control switch for establishing a charging circuit between said generator and said battery, a shunt operating winding for said switch connected across the terminals of said generator to close said switch when the voltage of said generator equals or exceeds the votage of said battery, and a pair of series windings associated with said switch for inclusion in said charging circuit upon closure of said switch, one of said series windings acting cumulatively with said shunt winding to maintain said switch in closed position as long as the voltage of said generator exeeeds the voltage of said battery and acting in opposition thereto when the voltage of said generator drops below the voltage of said battery, and the other of said series windings acting to effect opening of said switch when said former series fluid winding acts in opposition to said shunt winding.

3. In a power supply system, the combination with a battery and a generator for charging the same, of a normally open control switch for establishing a charging circuit between said generator and said battery, a shunt operating winding for said switch connected across the terminals of said generator to effect response thereof when the voltage of said generator equals or exceeds the voltage of said battery, means for weakening said shunt winding upon response of said switch, and a pair of series windings associated with said switch to be included in said charging circuit upon closure of said switch, one of said series windings acting cumulatively with said shunt winding to maintain said switch in closed position as long as the voltage of said generator exceeds the voltage of said battery and acting in opposition thereto when the voltage of said generator drops below the voltage of said battery, and the other of said series windings acting to effect immediate opening of said switch when said former series winding acts in opposition to said shunt winding.

4. In a power supply system, the combination with a battery and a generator for charging the same, of a normally open control switch for establishing a charging circuit between said generator and said battery, said control switch having a pair of operating core members associated therewith, one for effecting closure thereof and the other for effecting opening thereof, a shunt operating winding mounted upon said first mentioned core member and connected across the terminals of said generator to effect closure of said switch when the voltage of said generator equals or exceeds the voltage of said battery, and a series winding mounted upon each of said core members for inclusion in said charging circuit upon closure of said switch, the series winding on said first mentioned core member acting cumulatively with said shunt winding as long as the voltage of said generator exceeds the voltage of said battery and acting in opposition thereto when the voltage of said generator drops below the voltage of said battery and the series winding on said second mentioned core member acting to effect opening of said switch when said former series winding acts in opposition to said shunt winding.

CLARENCE W. KUHN.

REFERENCES CITED

The following references are of record in the file of this patent:

UNITED STATES PATENTS

| Number | Name | Date |
| --- | --- | --- |
| 607,124 | Negbaur | July 12, 1898 |
| 872,215 | Bliss | Nov. 26, 1907 |
| 1,678,808 | Creveling | July 31, 1928 |
| 1,752,900 | Eisenmann | Apr. 1, 1930 |
| 2,338,957 | Munz | Jan. 11, 1944 |
| 2,386,921 | Albers | Oct. 16, 1945 |
| 2,455,060 | Holmes | Nov. 30, 1948 |